J. C. LINCOLN.
PORTABLE MEANS FOR SECURING THE REVERSE FLOW OF ELECTRIC CURRENTS.
APPLICATION FILED FEB. 6, 1914.
1,201,837.
Patented Oct. 17, 1916.
2 SHEETS—SHEET 1.
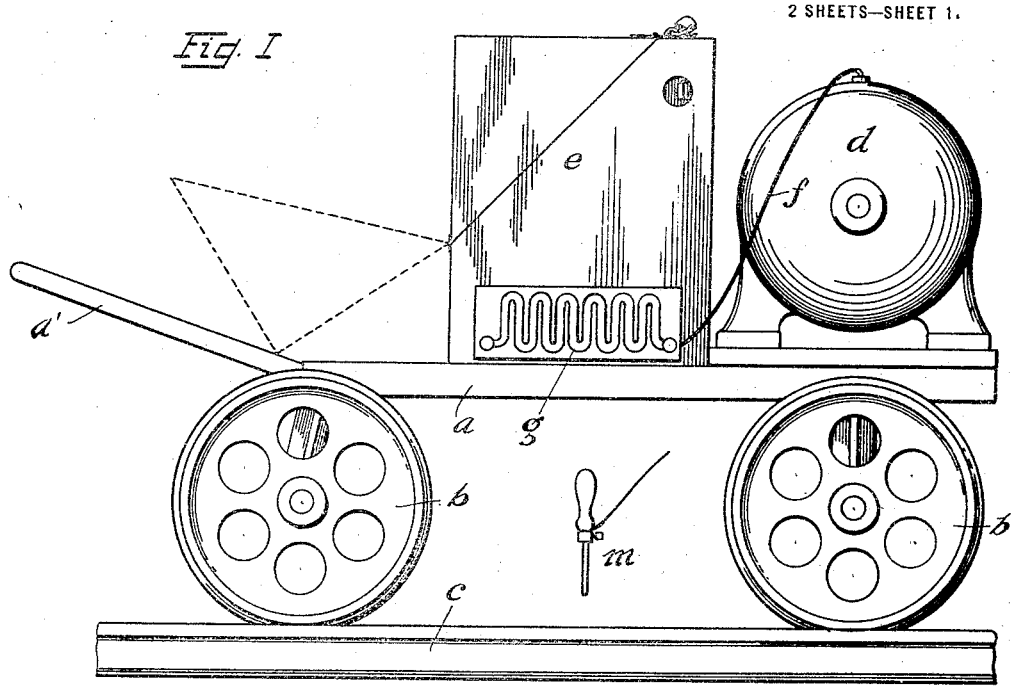
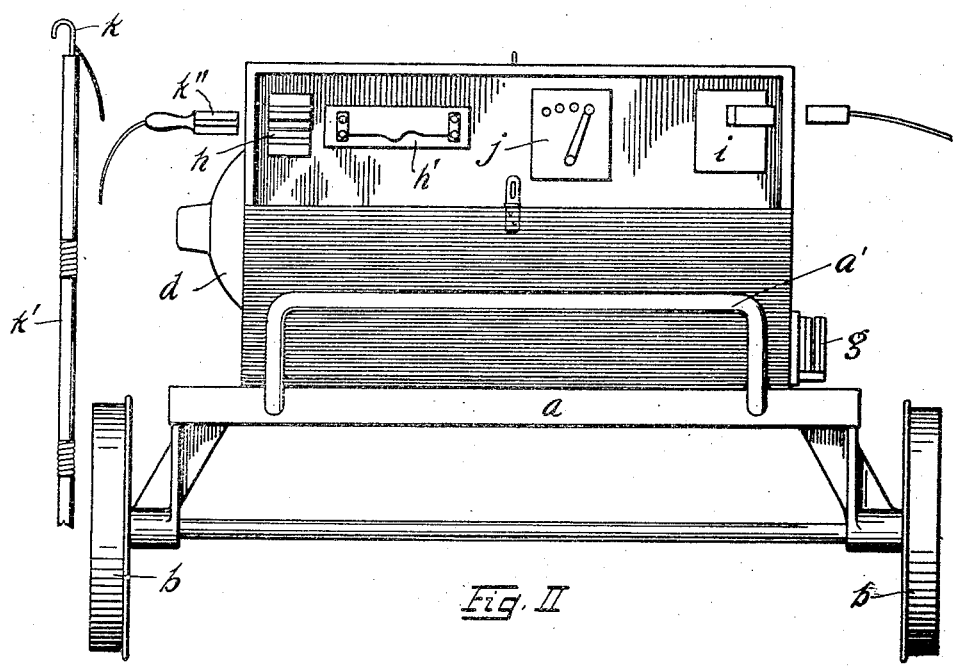
Witnesses:
F. C. Valentine
M. A. Driscoll
Inventor:
John C. Lincoln,
by his Attorney J. C. LINCOLN.
PORTABLE MEANS FOR SECURING THE REVERSE FLOW OF ELECTRIC CURRENTS.
APPLICATION FILED FEB. 6, 1914.
1,201,837.
Patented Oct. 17, 1916.
2 SHEETS—SHEET 2.
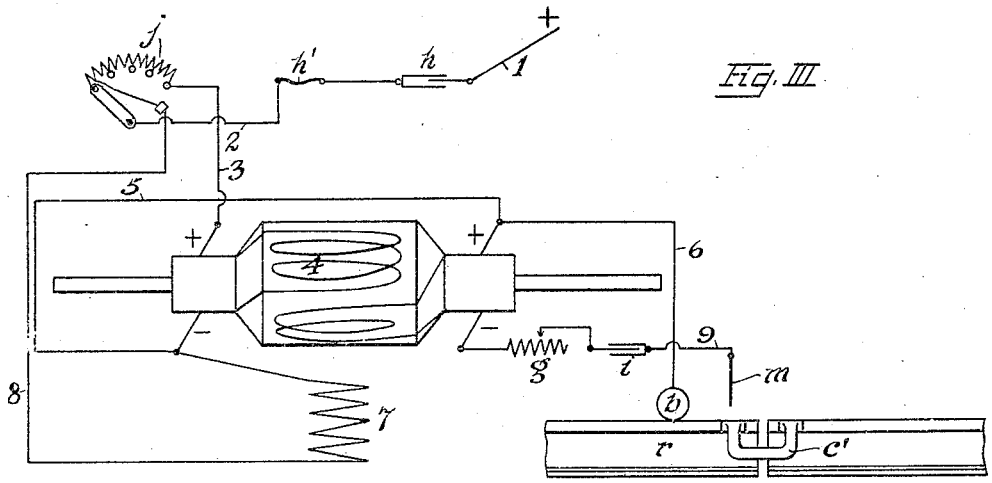
Fig. III.
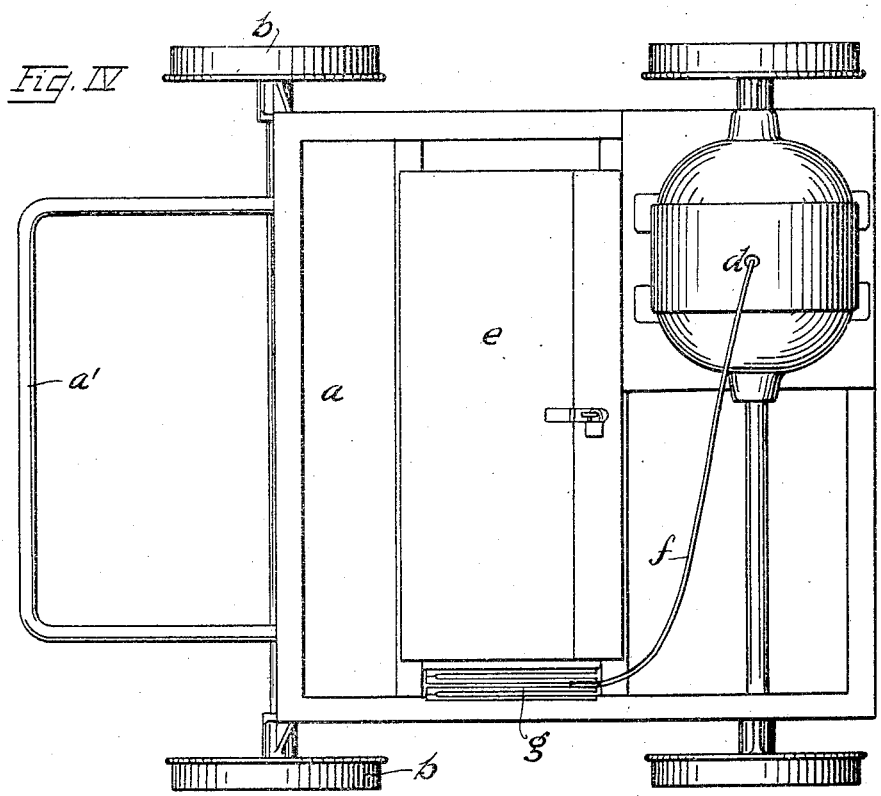
Fig. IV
Witnesses:
F. C. Valentine
M. A. Driscoll
Inventor:
John C. Lincoln,
his attorney.

UNITED STATES PATENT OFFICE.

JOHN C. LINCOLN, OF CLEVELAND, OHIO.

PORTABLE MEANS FOR SECURING THE REVERSE FLOW OF ELECTRIC CURRENTS.

1,201,837.    Specification of Letters Patent.    Patented Oct. 17, 1916.

Application filed February 6, 1914. Serial No. 817,019.

*To all whom it may concern:*

Be it known that I, JOHN C. LINCOLN, a citizen of the United States, residing at Cleveland, in the county of Cuyahoga and State of Ohio, have invented certain new and useful Improvements in Portable Means for Securing the Reverse Flow of Electric Currents, of which the following is a specification.

My invention relates to improvements in portable means for securing the reverse flow of electric currents and comprises apparatus which may be employed in connection with the ordinary trolley circuit for reversing the current, to effect electric welding of the bonds and rails.

As explained in a prior application of mine, Serial No. 783,973, filed August 9, 1913, it is distinctly preferable to employ the negative terminal of an electric arc for the purpose of effecting a welded joint between the rail-ends. This is true both for forming electric bonds and for bodily uniting the rail-ends. In practice, it is found that the rails themselves most commonly form the negative side of the circuit, thereby preventing the direct application of the trolley current to the rail-ends, in order to effect a weld by means of the electric arc. Accordingly, I have equipped a light car adapted to travel upon the rails, with a dynamotor, which is constructed to receive the trolley current through one of the armature windings of said dynamotor and convert the same, through its co-acting armature windings, to a direct current which may be applied in short circuit through suitable interposed resistance, directly to the desired weld. This permits the negative terminal of the circuit to be employed for striking the arc at the welding point. The dynamotor preferably is so positioned upon the car that its weight is carried principally by one of the four supporting wheels, so that the center of gravity is suitably positioned in order that a single workman may readily remove and replace the car upon the rails. Moreover, a shelter box containing switching mechanism, a rheostat, and other accessories, together with resistance grids, are electrically connected with the dynamotor, and will be more fully explained in connection with the accompanying drawings, wherein:—

Figure I is a view in side elevation of a car, dynamotor and associated apparatus, constructed in accordance with my invention. Fig. II is a front view of said car, showing the shelter-box opened. Fig. III is a diagrammatic view of electrical apparatus and connections, and Fig. IV is a plan view of the car and its supported apparatus.

Throughout the several figures of the drawings, I have employed the same character of reference to indicate similar parts.

The platform $a$ of the car is provided with a suitable handle $a'$ and is carried by four supporting wheels $b$. These are preferably the ordinary light type of car wheel, spaced at standard gage for resting upon the rails $c$. A dynamotor $d$ is positioned upon the platform, directly above the axle of the rear car-wheel and closely adjacent to one side thereof, so that its weight is principally supported by one wheel, as the left rear wheel. A box $e$, having a suitable hinged cover, is mounted centrally of said car, and is adapted to contain the accessories and tools for working with the apparatus. Exterior thereof, are provided series of grids $g$ connected with the dynamotor in adjustable relation by the insulated cable $f$. Interiorly of said box, are positioned switching terminals $h$, $i$, for the incoming and outgoing circuits, a fuse block $h'$ and a starting rheostat $j$. A hook $k$, provided with a jointed handle $k'$ and a switch-plug $k''$, is adapted to make connections with the trolley wire. When said switch plug is inserted between the switch-contacts $h$, the primary circuit of the motor is thus energized in the well known manner and the secondary armature circuit, wound to furnish any suitable welding current, is adapted to deliver the necessary power and permit its reverse application to the rail-ends and bond through a negative electrode.

Referring to the diagram (Fig. III), the several parts will at once be recognized; the current being traced from the positive side of the circuit through trolley 1 (one), switch contacts $h$, fuse $h'$, conductor 2, rheostat $j$, conductor 3, primary windings of armature 4 and the left hand commutator of the dynamotor, conductors 5, 6, wheel $b$ and rail $r$, which is assumed to be the negative terminal of the trolley circuit. The circuit through the shunt field 7 is established by the conductor 8. The secondary circuit of the dynamotor is taken from its right hand commutator, the positive side being connected with the rail $c$ through conductor 6 and wheel $b$, while the negative side leads through the resistance grids $g$ or any portion thereof adjustably connected in circuit, conductor 9 and negative electrode $m$, by which the welding arc is adapted to be struck. A bond $c$ is shown in position for welding upon the rail-ends.

The two windings of the armature are suitably proportioned to adapt them respectively for the energizing circuit, which may be assumed to be five hundred volts, and the welding circuit, which may be approximately from seventy to one hundred volts. As is well known in the art, however, any desired relation between the incoming and the outgoing currents may be secured by properly proportioning the armature windings. My principal object to be attained, however, is to permit the rail to be made the positive terminal of the welding circuit, which is the reverse of ordinary trolley railway practice.

From the foregoing description, it will be seen that the car may be wheeled upon the rails to any desired point at which the welding operations are to take place, or it may be carried for long distances upon a suitable motor truck to approximately the point desired. Having mounted his car upon the rails, the workman proceeds to establish connection with the trolley wire and start the dynamotor in the usual manner. The secondary circuit may be suitably regulated, by directing the current in the sectional grids. If a bond, for example, is to be welded upon the rail-ends, a carbon electrode forming the negative terminal of the secondary circuit is applied alternately to the rail-ends and to the bond, for the purpose of effecting a weld between these parts. Similarly, if the rail-ends or their fish-plates are to be welded, preferably a metallic electrode is employed, which serves to supply additional metal to the weld thus formed. Obviously either terminal of the secondary circuit may be employed for effecting the weld, while only the positive terminal of most trolley circuits is available for this purpose. As explained, the direct trolley circuit is commercially impracticable for effecting welded connections.

By the term "dynamotor" employed throughout the specification and claims, I wish to be understood as contemplating a combined electric motor and generator, having a common field structure, by means of which suitable current can be drawn from the source of supply, at one voltage and delivered for use at another voltage.

By reason of positioning the dynamotor upon one corner of the car, so that its weight is unequally borne or distributed by the wheels, a single workman, who alone is required to perform the welding operations, may also remove and replace the car upon the rails with ease. This is of prime importance upon trolley roads, inasmuch as passing cars are but slightly delayed, and the welding operations need not be seriously interrupted, as would be necessary, if the car required side-tracking, ordinarily at some distant point, each time a trolley car passed.

Having now explained the preferred embodiment of my invention, I claim as new and desire to secure by Letters Patent, the following:—

1. In portable means for reversing the electric current, the combination with a car, of a dynamotor mounted thereon, comprising a field structure equipped with two armature windings, means for effecting temporary connection between said dynamotor including one of its armature windings and an energizing trolley circuit, and a secondary circuit including an armature winding of the dynamotor wherein the reverse current may be utilized, substantially as set forth.

2. In apparatus of the class described, the combination with a car, of a dynamo-electric machine mounted thereon adjacent to one of its supporting wheels, whereby the center of gravity is positioned near said wheel, and means for effecting the temporary connection of said dynamo-electric machine with a power circuit, substantially as set forth.

3. In apparatus of the class described, the combination with a car having four flanged wheels, of a dynamo-electric machine mounted thereon closely adjacent to one of said wheels, controlling apparatus also mounted adjacent to said wheel and the dynamo electric machine, whereby the center of gravity is positioned near said wheel, and means for effecting the temporary connection of said dynamo-electric machine with a power circuit and through the wheels, substantially as set forth.

4. In apparatus of the class described, for modifying the voltage and direction of the electric current, the combination with a vehicle or car, of a dynamotor portably mounted thereon comprising a common field structure, equipped with two armature-windings and their commutators, a starting rheostat provided upon said car, means for temporarily connecting the dynamotor with an external supply of current through said starting rheostat, and resistance grids also mounted upon the car and adapted to be adjustably connected in circuit with the secondary armature-winding, substantially as set forth.

5. In apparatus of the class described, the combination with a car or vehicle having four flanged supporting wheels, of a dynamo-electric machine, portably mounted thereon closely adjacent to one of the supporting wheels of said vehicle, whereby its weight is principally carried by said wheel, means for temporarily connecting said machine with an external source of current, a starting rheostat, and resistance grids also provided upon said car, substantially as set forth.

In testimony whereof I do now affix my signature in the presence of two witnesses.

JOHN C. LINCOLN.

Witnesses:
  M. A. DRISCOLL,
  ALBERT LYNN LAWRENCE.